United States Patent
Kim et al.

(10) Patent No.: US 10,014,498 B2
(45) Date of Patent: Jul. 3, 2018

(54) PRISMATIC BATTERY CELL HAVING BATTERY CASE COMPRISING TWO OR MORE MEMBERS

(71) Applicant: LG CHEM, LTD., Seoul (KR)

(72) Inventors: Tae Wook Kim, Daejeon (KR); Seog Jin Yoon, Daejeon (KR); Hyung Ku Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 194 days.

(21) Appl. No.: 14/913,164

(22) PCT Filed: Jul. 15, 2014

(86) PCT No.: PCT/KR2014/006375
§ 371 (c)(1),
(2) Date: Feb. 19, 2016

(87) PCT Pub. No.: WO2015/034172
PCT Pub. Date: Mar. 12, 2015

(65) Prior Publication Data
US 2016/0204396 A1 Jul. 14, 2016

(30) Foreign Application Priority Data
Sep. 5, 2013 (KR) .................. 10-2013-0106712

(51) Int. Cl.
*H01M 2/04* (2006.01)
*H01M 2/02* (2006.01)
(Continued)

(52) U.S. Cl.
CPC ......... *H01M 2/0473* (2013.01); *H01M 2/024* (2013.01); *H01M 2/0217* (2013.01);
(Continued)

(58) Field of Classification Search
CPC .. H01M 2/0473; H01M 2/0404; H01M 2/043; H01M 2/06; H01M 2/305;
(Continued)

(56) References Cited

U.S. PATENT DOCUMENTS 6,242,130 B1  6/2001  Noh et al.
6,630,270 B1  10/2003 Kim et al.
(Continued)

FOREIGN PATENT DOCUMENTS

CN   1473367 A    2/2004
CN   1855599 A    11/2006
(Continued)

OTHER PUBLICATIONS

International Search Report (PCT/ISA/210) issued in PCT/KR2014/006375, dated Oct. 24, 2014.

*Primary Examiner* — Jane Rhee
(74) *Attorney, Agent, or Firm* — Birch, Stewart, Kolasch & Birch, LLP (57) ABSTRACT

Disclosed herein is a prismatic battery cell wherein a cap plate is mounted at an open top of a prismatic cell case in a state in which an electrode assembly configured to have a structure in which a separator is disposed between a cathode and an anode is mounted in the prismatic cell case, the cap plate is provided with an anode terminal or a cathode terminal as a protruding terminal, and the prismatic cell case is configured to have a structure in which two or more case members divided in a major axis direction, in a minor axis direction, or in the major axis direction and the minor axis direction based on a horizontal sectional shape of the cap plate with respect to the protruding terminal are coupled to each other.

19 Claims, 6 Drawing Sheets

(51) Int. Cl.
*H01M 2/06* (2006.01)
*H01M 2/30* (2006.01)
*H01M 10/052* (2010.01)

(52) U.S. Cl.
CPC ....... *H01M 2/0237* (2013.01); *H01M 2/0285* (2013.01); *H01M 2/043* (2013.01); *H01M 2/0404* (2013.01); *H01M 2/06* (2013.01); *H01M 2/305* (2013.01); *H01M 2/30* (2013.01); *H01M 10/052* (2013.01); *H01M 2220/10* (2013.01); *H01M 2220/20* (2013.01); *H01M 2220/30* (2013.01)

(58) Field of Classification Search
CPC ............ H01M 2/0217; H01M 2/0237; H01M 2/0285; H01M 2/30; H01M 2/024; H01M 2220/10; H01M 2220/20; H01M 2220/30; H01M 10/052
See application file for complete search history.

(56) References Cited

U.S. PATENT DOCUMENTS

| | | | |
|---|---|---|---|
| 8,481,199 | B2 | 7/2013 | Zama et al. |
| 2005/0208345 | A1 | 9/2005 | Yoon et al. |
| 2006/0127756 | A1* | 6/2006 | Seo ............ H01M 2/021 429/175 |
| 2010/0178534 | A1 | 7/2010 | Lee et al. |
| 2011/0143193 | A1* | 6/2011 | Ahn ............ H01M 2/0404 429/176 |
| 2011/0183181 | A1 | 7/2011 | Moon et al. |
| 2012/0244423 | A1 | 9/2012 | Kusukawa et al. |
| 2013/0224541 | A1 | 8/2013 | Nam et al. |

FOREIGN PATENT DOCUMENTS

| | | |
|---|---|---|
| CN | 103098260 A | 5/2013 |
| DE | 40 41 123 C1 | 1/1992 |
| EP | 0 969 534 A1 | 1/2000 |
| EP | 2 426 750 B1 | 11/2012 |
| JP | 51-162928 U | 12/1986 |
| JP | 63-193460 A | 8/1988 |
| JP | 08-161881 A | 6/1996 |
| JP | 10-202379 A | 8/1998 |
| JP | 2001-226271 A | 8/2001 |
| JP | 2001-236929 A | 8/2001 |
| JP | 2002-198011 A | 7/2002 |
| JP | 2002-298826 A | 10/2002 |
| JP | 2005123183 A | 5/2005 |
| JP | 2005-153015 A | 6/2005 |
| JP | 2005-166974 A | 6/2005 |
| JP | 2007-227394 A | 9/2007 |
| JP | 2011-076968 A | 4/2011 |
| JP | 2011-124204 A | 6/2011 |
| JP | 2012-174433 A | 9/2012 |
| JP | 2014-59954 A | 4/2014 |
| KR | 10-2005-0077744 A | 8/2005 |
| KR | 10-2006-0102249 A | 9/2006 |
| KR | 10-2008-0102249 A | 9/2006 |
| KR | 10-2010-0044404 A | 4/2010 |
| KR | 10-2010-0083273 A | 7/2010 |
| KR | 10-1036089 B1 | 5/2011 |
| TW | M433673 U1 | 7/2012 |
| TW | 201330365 A | 7/2013 |

\* cited by examiner

PRISMATIC BATTERY CELL HAVING BATTERY CASE COMPRISING TWO OR MORE MEMBERS

TECHNICAL FIELD

The present invention relates to a prismatic battery cell having a battery case including two or more members and, more particularly, to a prismatic battery cell wherein a cap plate is mounted at an open top of a prismatic cell case in a state in which an electrode assembly configured to have a structure in which a separator is disposed between a cathode and an anode is mounted in the prismatic cell case, the cap plate is provided with an anode terminal or a cathode terminal as a protruding terminal, and the prismatic cell case is configured to have a structure in which two or more case members divided in a major axis direction, in a minor axis direction, or in the major axis direction and the minor axis direction based on a horizontal sectional shape of the cap plate with respect to the protruding terminal are coupled to each other.

BACKGROUND ART

Secondary batteries may be classified based on the structure of an electrode assembly having a cathode/separator/anode structure. For example, the electrode assembly may be configured to have a jelly-roll (wound) type structure in which long sheet type cathodes and long sheet type anodes are wound in a state in which separators are disposed respectively between the cathodes and the anodes, a stacked type structure in which pluralities of cathodes and anodes having a predetermined size are sequentially stacked in a state in which separators are disposed respectively between the cathodes and the anodes, or a stacked/folded type structure in which pluralities of cathodes and anodes having a predetermined size are sequentially stacked in a state in which separators are disposed respectively between the cathodes and the anodes to constitute a bicell or a full cell and then a plurality of bi-cells or full-cells is folded.

In addition, secondary batteries may be classified into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of an aluminum laminate sheet based on the shape of the battery case of each of the secondary batteries.

Particularly, in recent years, a prismatic battery having a relatively small width has been developed according to a trend of reducing the size and weight of electronic mobile devices and the prismatic battery has created applications other than the conventional cylindrical battery.

Figure 1:
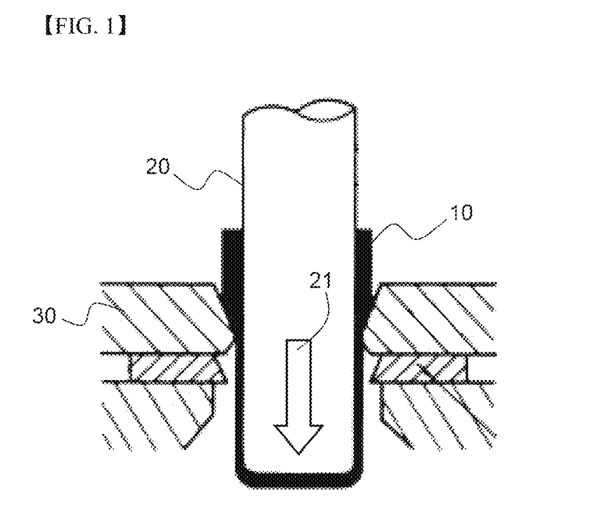
FIG. 1 is a side cutaway view typically showing a partial process of manufacturing a prismatic battery case using a conventional deep drawing process.

In general, the prismatic battery is manufactured by inserting some battery elements into a prismatic hollow case closed at the bottom thereof, welding a top cap assembly, injecting an electrolyte through an injection port, and sealing the injection port. The prismatic hollow case closed at the bottom thereof is generally manufactured by machining an aluminum alloy sheet using a deep drawing method as shown in FIG. 1. The deep drawing method is a typical forming method that manufactures a seamless hollow container from a flat plate. For example, a plastic deformation method that presses a flat plate 10 located on a die 30 using a punch 20 as indicated by an arrow denoted by reference numeral 21 may be used as the deep drawing method.

The deep drawing method has an advantage in that it is possible to manufacture a final hollow case from a flat plate through a series of continuous processes, thereby improving manufacturing efficiency. However, the deep drawing method has the following problems.

First, the deep drawing method includes about 10 or more complicated and sophisticated steps. For this reason, manufacturing cost of an apparatus for performing the deep drawing method is very high. In particular, it takes a long period of 2 or 3 months to manufacture a die, which greatly increases time necessary to develop a battery satisfying consumers' demand.

Second, in a case in which a metal sheet is machined using the deep drawing method, various regions of the metal sheet have different drawing degrees depending upon the shape of the die. According to circumstances, a corner rupture phenomenon may occur in a case in which drawing of the metal sheet exceeds an allowable drawing range. Consequently, shapes that can be obtained using the deep drawing method are limited.

For the above reasons, a product defect rate is high and shapes of a case are limited in a case in which the deep drawing method is used.

Consequently, there is a high necessity for a technology that is capable of fundamentally solving the above problems.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have completed the present invention. It is an object of the present invention to provide a prismatic battery cell configured to have a structure in which two or more divided case members having a specific structure are coupled to each other to constitute a cell case, whereby a manufacturing process is simplified, production efficiency is improved, and production cost is reduced.

It is another object of the present invention to provide a prismatic battery cell that can be variously designed without limitations in the shape of a prismatic cell case and wherein cost and time necessary to manufacture the cell case are reduced, whereby a product defect rate is reduced while production efficiency is improved.

Technical Solution

In accordance with one aspect of the present invention, the above and other objects can be accomplished by the provision of a prismatic battery cell wherein a cap plate is mounted at an open top of a prismatic cell case in a state in which an electrode assembly configured to have a structure in which a separator is disposed between a cathode and an anode is mounted in the prismatic cell case, the cap plate is provided with an anode terminal or a cathode terminal as a protruding terminal, and the prismatic cell case is configured to have a structure in which two or more case members divided in a major axis direction, in a minor axis direction, or in the major axis direction and the minor axis direction based on a horizontal sectional shape of the cap plate with respect to the protruding terminal are coupled to each other.

Consequently, the prismatic battery cell according to the present invention is configured to have a structure in which the divided case members are coupled to each other to constitute one cell case. As compared with a battery cell manufactured using the deep drawing method, manufacturing cost is reduced and battery cell manufacturing time is greatly reduced. In addition, it is possible to variously design the battery cell and, at the same time, to reduce a product defect rate. For example, it is possible to easily manufacture a battery cell having a size that can be easily manufactured using the deep drawing method.

In the prismatic battery cell according to the present invention, the cap plate may be a single-unit member and the anode terminal may be formed at a middle portion of the cap plate as the protruding terminal.

In a concrete example, the prismatic cell case may be formed in a shape in which two case members divided in the minor axis direction are coupled to each other. In this case, the case members may be formed in the same shape. However, the present invention is not limited thereto. In a case in which the case members are formed in the same shape as described above, it is possible to simplify a manufacturing process and to improve production efficiency, thereby reducing production cost.

In another concrete example, the prismatic cell case may be formed in a shape in which two case members divided in the major axis direction are coupled to each other. In this case, the case members may be formed in the same shape. However, the present invention is not limited thereto. In a case in which the case members having the above-described structure are coupled to each other, the case members may be formed such that opposite ends of the case members have a larger thickness than other portions of the case members so as to improve coupling strength and sealability.

Meanwhile, the case members may be manufactured using various methods. For example, the case members may be manufactured by bending a metal sheet such that the metal sheet has a shape corresponding to the cell case. Alternatively, the case members may be manufactured by forging, blanking, or cutting.

Specifically, a prismatic cell case manufactured using the deep drawing method may be cracked during machining of the prismatic cell case accompanied by drawing with the result that strength of the prismatic cell case is greatly lowered. According to circumstances, the prismatic cell case may be broken, which increases a product defect rate. Furthermore, the lowered strength of the prismatic cell case reduces sealing force and the prismatic cell case is easily broken due to external impact. In addition, it is not possible to manufacture a prismatic cell case having a uniform depth and width due to these problems. On the other hand, the battery cell according to the present invention does not have the above-described limitations.

In the present invention, the case members may be coupled to each other in various fashions.

In a concrete example, the cell case may be manufactured by welding an interface between the case members in a state in which the case members are in tight contact with each other so as to have a shape of the cell case such that contact ends of the case members face each other.

In another concrete example, the cell case may be manufactured by welding an interface between the case members in a state in which the case members are in tight contact with each other so as to have a shape of the cell case such that contact ends of the case members overlap each other. In this case, the overlapped contact ends of the case members may be rolled such that a sum of thicknesses of the overlapped contact ends is equal to a thickness of any one of the case members and then the interface between the case members may be welded.

Methods of welding the case members are not particularly restricted so long as the two case members can be coupled to each other with high strength. For example, the case members may be coupled to each other by laser welding, arc welding, electric resistance welding, gas welding, ultrasonic welding, etc. Specifically, the case members may be coupled to each other by the laser welding.

The material for the cell case and the cap plate constituting the prismatic battery cell according to the present invention is not particularly restricted so long as the material for the cell case and the cap plate has physical properties proper to the cell case and the cap plate, can be manufactured in the form of a flat plate, and can be used in a process of manufacturing the cell case and the cap plate. Specifically, the cell case and the cap plate may be made of aluminum or an aluminum alloy.

In addition, the cell case may have a predetermined thickness. For example, the cell case may have a thickness of 0.1 to 1.0 mm. Specifically, if the thickness of the cell case is too large, the overall thickness or volume of the manufactured battery cell may be increased. On the other hand, if the thickness of the cell case is too small, the cell case may not have desired mechanical strength with the result that it is not possible to protect the prismatic battery cell against external impact.

The battery cell according to the present invention may be configured to have a structure in which a folded type electrode assembly, a stacked type electrode assembly, or a stacked/folded type electrode assembly is received in the cell case.

The type of the prismatic battery cell according to the present invention is not particularly restricted so long as the above-described electrode assembly is mounted in the cell case. As a concrete example, the battery cell may be a lithium secondary battery having high energy density, discharge voltage, and output stability.

The construction, structure, and manufacturing method of the battery cell, including the lithium secondary battery, are well known in the art to which the present invention pertains and, therefore, a detailed description thereof will be omitted.

In accordance with another aspect of the present invention, there is provided a battery pack including one or more prismatic battery cells with the above-stated construction.

In accordance with a further aspect of the present invention, there is provided a device using the battery pack as a power source. Specifically, the device may be selected from among a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage apparatus.

The above-mentioned devices and apparatuses are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

A prismatic battery cell according to the present invention is manufactured by preparing case members constituting a prismatic cell case open at the top thereof, preparing a cap plate corresponding to the top of the cell case, and coupling the cap plate to the case members by welding.

The prismatic battery cell according to the present invention is characterized in that it is possible to manufacture a prismatic cell case closed at the bottom thereof without using a conventional deep drawing method.

The term "prismatic" used in this specification is intended to comprehensively express that a horizontal sectional shape of a case does not include a curved region, such as a circular region or an oval region, but includes a linear region. For example, the case may be formed in a quadrangular shape, a triangular shape, or a pentagonal shape. Preferably, the case is formed in a rectangular shape in which a pair of sides (longer sides) is longer than another pair of sides (shorter sides). In addition, the prismatic shape also includes a shape in which a corner at which two straight lines intersect is rounded.

Now, preferred embodiments of the present invention will be described in detail with reference to the accompanying drawings. It should be noted, however, that the scope of the present invention is not limited by the illustrated embodiments.

Figure 2:
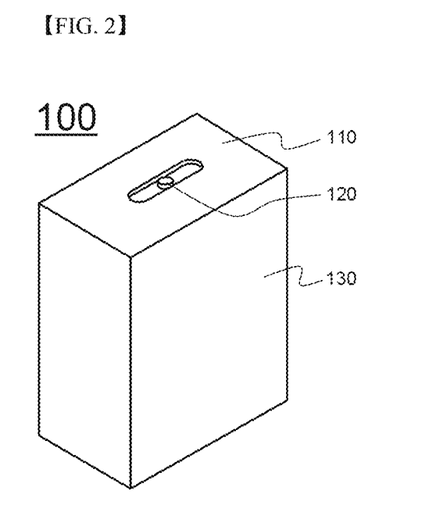
FIG. 2 is a perspective view showing the appearance of a prismatic battery cell according to an embodiment of the present invention.

FIG. 2 is a perspective view typically showing the appearance of a prismatic battery cell according to an embodiment of the present invention.

Referring to FIG. 2, the prismatic battery cell 100 according to the embodiment of the present invention is configured to have a structure in which an electrode assembly (not shown) including cathodes, anodes, and separators disposed respective between the cathodes and the anodes is mounted in a prismatic cell case 130.

The prismatic battery cell 100 is configured to have a structure in which a cap plate 110 having a protruding terminal 120 is mounted at an open top of the cell case 130, which is formed in a rectangular shape. The cap plate 110 is a single unit member.

Figure 3:
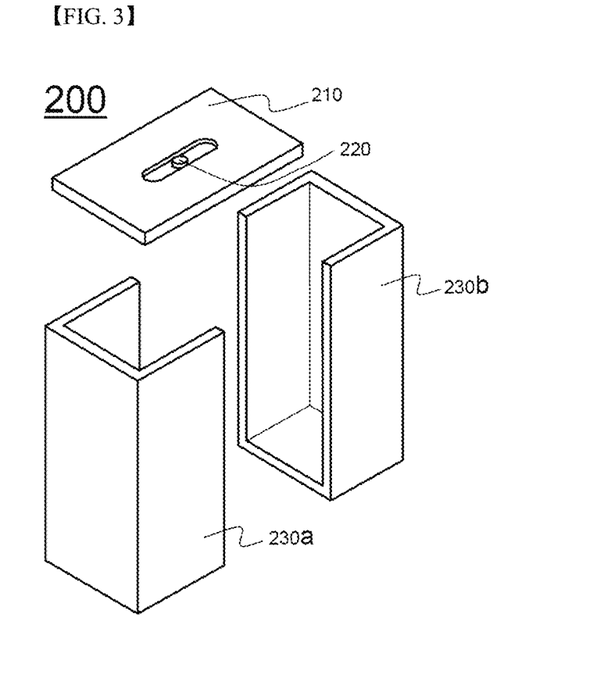
FIG. 3 is a perspective view showing case members divided in a minor axis direction according to an embodiment of the present invention before coupling between the case members.

FIG. 3 is a perspective view typically showing two case members 230a and 230b divided in a minor axis direction according to an embodiment of the present invention before a cap plate 210 is coupled to the case members 230a and 230b.

Referring to FIG. 3, the two case members 230a and 230b divided in the minor axis direction are formed in the same shape. The cap plate 210, which has a protruding terminal 220, is coupled to open tops of the two case members 230a and 230b.

Figure 4:
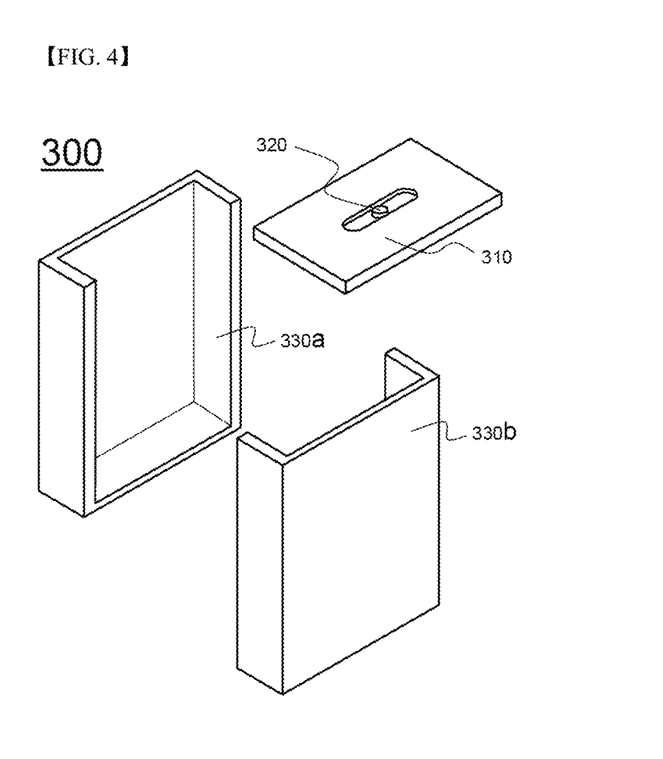
FIG. 4 is a perspective view showing case members divided in a major axis direction according to another embodiment of the present invention before coupling between the case members.

FIG. 4 is a perspective view typically showing two case members 330a and 330b divided in a major axis direction according to another embodiment of the present invention before a cap plate 310 is coupled to the case members 330a and 330b.

Referring to FIG. 4, the two case members 330a and 330b divided in the major axis direction are formed in the same shape. The cap plate 310, which has a protruding terminal 320, is coupled to open tops of the two case members 330a and 330b.

As previously described, the case members 230a, 230b, 330a, and 330b are formed in the same shape. Consequently, it is possible to simplify a process of manufacturing a prismatic battery cell, to shorten manufacturing time, and to reduce manufacturing cost.

Figure 5:
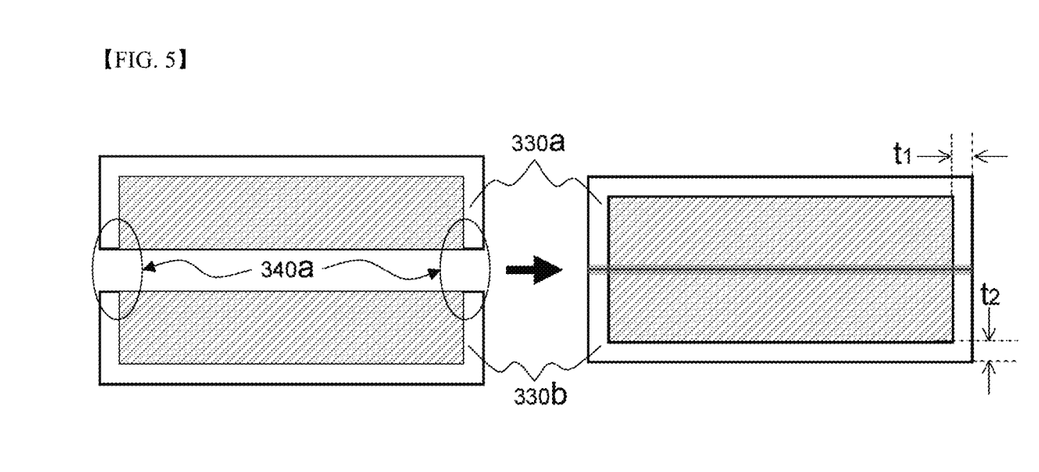
FIGS. 5 and 6 are plan views showing coupling between the case members divided in the major axis direction shown in FIG. 4.
Figure 6:
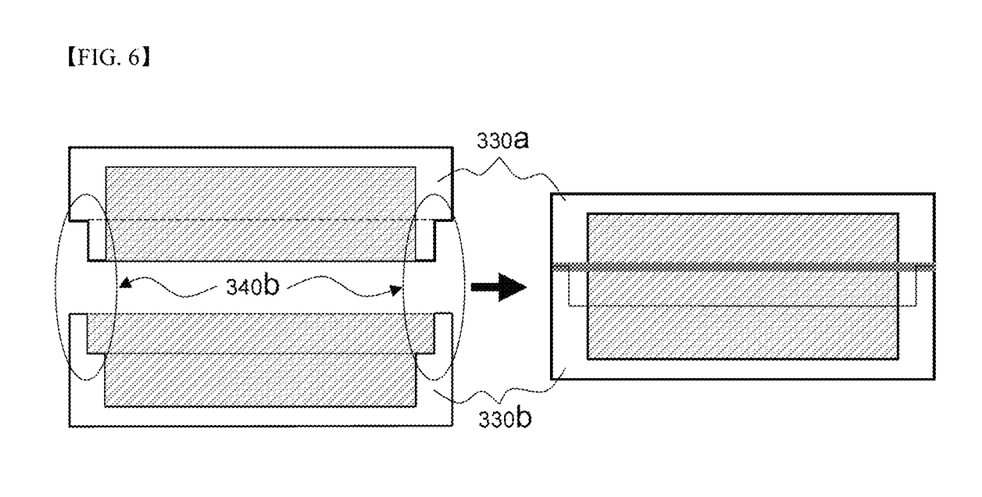

FIGS. 5 and 6 are plan views showing coupling between the two case members 330a and 330b divided in the major axis direction shown in FIG. 4.

In this case, the case members 330a and 330b have a thickness of 0.1 to 1.0 mm. A thickness t1 of opposite ends of the case members 330a and 330b coupled to each other while facing each other is greater than a thickness t2 of other sides of the case members 330a and 330b adjacent to the opposite ends of the case members 330a and 330b. For example, the thickness t1 may be 1.1 to 5 times the thickness t2.

The case members 330a and 330b are manufactured by bending a metal sheet such that the metal sheet has a shape corresponding to the cell case. Alternatively, the case members 330a and 330b are manufactured by forging, blanking, or cutting.

Referring to FIG. 5, interfaces between the case members 330a and 330b are welded in a state in which the case members 330a and 330b are in tight contact with each other so as to have a shape of the cell case such that contact ends 340a of the case members 330a and 330b face each other.

According to circumstances, as shown in FIG. 6, interfaces between the case members 330a and 330b are welded in a state in which the case members 330a and 330b are in tight contact with each other so as to have a shape of the cell case such that contact ends 340b of the case members 330a and 330b having corresponding steps overlap each other. Laser welding may be performed as the welding method.

Figure 7:
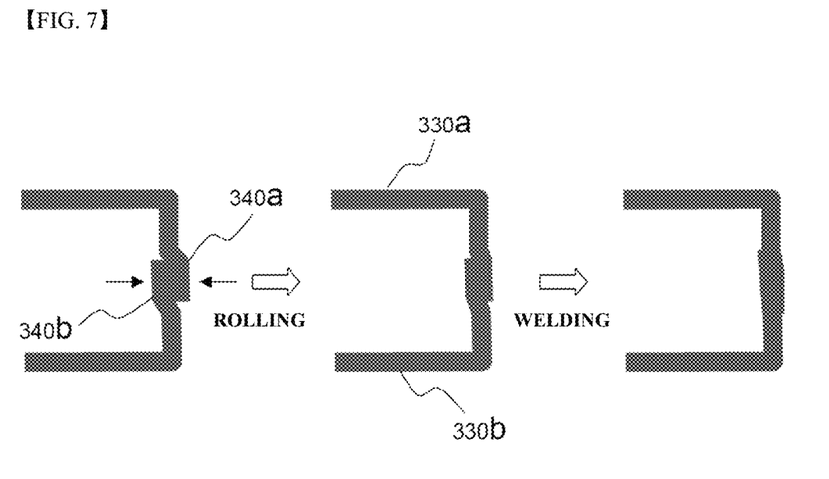
FIG. 7 is a series of partial sectional views showing a series of processes in which divided case members according to a further embodiment of the present invention are coupled to each other.

Another example in which the contact ends of the case members overlap each other is shown in FIG. 7. Referring to FIG. 7, the contact ends 340a and 340b of the case members 330a and 330b are rolled such that the sum of the thicknesses of the contact ends 340a and 340b is almost equal to the thickness of the case member 330a or 330b and then interfaces between the case members 330a and 330b are welded.

Referring back to FIGS. 5 and 6, manufacturing of the case members 330a and 330b and coupling between the case members 330a and 330b is equally applied to the two case members 230a and 230b divided in the minor axis direction.

Consequently, the prismatic battery cell according to the present invention is configured to have a structure in which two or more divided case members 230a, 230b, 330a, and 330b are coupled to each other to constitute one cell case. As compared with a battery cell manufactured using the conventional deep drawing method, apparatus manufacturing cost is reduced and, therefore, battery manufacturing cost is also reduced. Furthermore, time necessary to design and manufacture the apparatus for performing the method is very short. Consequently, it is possible to greatly reduce time incurred from design to production of a new type of battery.

In addition, at the same time, it is possible to variously design the cell case without limitations in height of the cell case and a ratio in length of the longer sides to the shorter sides of the cell case and to reduce a product defect rate.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the prismatic battery cell according to the present invention is configured to have a structure in which two or more divided case members having a specific structure are coupled to each other to constitute a cell case. Consequently, a manufacturing process is simplified and production efficiency is improved, thereby reducing production cost.

In addition, at the same time, it is possible to variously design the prismatic battery cell without limitations in shape of the prismatic cell case and to reduce cost and time necessary to manufacture the cell case, thereby reducing a product defect rate while improving production efficiency.

The invention claimed is:

1. A prismatic battery cell wherein
a cap plate is mounted at an open top of a prismatic cell case in a state in which an electrode assembly configured to have a structure in which a separator is disposed between a cathode and an anode is mounted in the prismatic cell case,
the cap plate is provided with an anode terminal or a cathode terminal as a protruding terminal,
the cap plate has a length measured along a major axis direction and a width measured along a minor axis direction in a plane in which the protruding terminal extends normal thereto,
the prismatic cell case is configured to have a structure in which two or more case members divided in the major axis direction, in the minor axis direction, or in the major axis direction and the minor axis direction are coupled to each other,
the cell case is manufactured by welding an interface between the case members in a state in which the case members are in tight contact with each other so as to have a shape of the cell case such that contact ends of the case members overlap each other, and
the overlapped contact ends of the case members are rolled such that a sum of thicknesses of the overlapped contact ends is equal to a thickness of any one of the case members and then the interface between the case members is welded.

2. The prismatic battery cell according to claim 1, wherein the cap plate is a single-unit member.

3. The prismatic battery cell according to claim 1, wherein the anode terminal is formed at a middle portion of the cap plate as the protruding terminal.

4. The prismatic battery cell according to claim 1, wherein the prismatic cell case is formed in a shape in which two case members divided in the minor axis direction are coupled to each other.

5. The prismatic battery cell according to claim 4, wherein the case members are formed in the same shape.

6. The prismatic battery cell according to claim 1, wherein the prismatic cell case is formed in a shape in which two case members divided in the major axis direction are coupled to each other.

7. The prismatic battery cell according to claim 6, wherein the case members are formed in the same shape.

8. The prismatic battery cell according to claim 6, wherein the case members are formed such that entire opposite ends of the case members have a larger thickness than other portions of the case members.

9. The prismatic battery cell according to claim 1, wherein the case members are manufactured by bending a metal sheet such that the metal sheet has a shape corresponding to the cell case.

10. The prismatic battery cell according to claim 1, wherein the case members are manufactured by forging, blanking, or cutting.

11. The prismatic battery cell according to claim 1, wherein the cell case is manufactured by welding an interface between the case members in a state in which the case members are in tight contact with each other so as to have a shape of the cell case such that contact ends of the case members face each other.

12. The prismatic battery cell according to claim 11, wherein laser welding is performed as the welding.

13. The prismatic battery cell according to claim 1, wherein the cell case and the cap plate are made of aluminum or an aluminum alloy.

14. The prismatic battery cell according to claim 1, wherein the cell case has a thickness of 0.1 to 1.0 mm.

15. The prismatic battery cell according to claim 1, wherein the electrode assembly is configured to have a folded type structure, a stacked type structure, or a stacked/folded type structure.

16. The prismatic battery cell according to claim 1, wherein the battery cell is a lithium secondary battery.

17. A battery pack comprising one or more battery cells according to claim 1.

18. A device using a battery pack according to claim 17 as a power source.

19. The device according to claim 18, wherein the device is selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage apparatus.

* * * * *